INVENTORS
KAZUYUKI NISHIMOTO
YOSHIO IIDA

Dec. 15, 1970  KAZUYUKI NISHIMOTO ET AL  3,547,794
PH-SENSOR

Filed Oct. 1, 1968  2 Sheets-Sheet 2

INVENTORS
KAZUYUKI NISHIMOTO
YOSHIO IIDA

BY *Wenderoth, Lind & Ponack*
ATTORNEYS

United States Patent Office 3,547,794
Patented Dec. 15, 1970

3,547,794
pH-SENSOR
Kazuyuki Nishimoto and Yoshio Iida, Osaka, Japan, assignors to Matsushita Electric Industrial Co., Ltd., Osaka, Japan
Filed Oct. 1, 1968, Ser. No. 764,108
Claims priority, application Japan, Oct. 24, 1967, 42/69,123
Int. Cl. G01n 27/36
U.S. Cl. 204—195
3 Claims

ABSTRACT OF THE DISCLOSURE

A pH-sensor for use in a telemetry capsule which can be swallowed by a patient. A cylindrical envelope has a spacer dividing said envelope into two spaces, a glass electrode is secured in one of said spaces, and a reference electrode is positioned in said other space in said envelope. A wafer of insulating material is attached to the bottom of said envelope and has two electric terminals on the outside surface thereof, one attached to the glass electrode and the other attached to the reference electrode, and a plate covers said other space on the opposite end of said envelope from said wafer and has at least one hole therein with a liquid permeable closure means therein for forming a liquid junction with said reference electrode. The sensor is adapted to have an oscillator unit attached thereto to form the telemetry capsule.

This invention relates to a small pH-sensor, and more particularly to a radio capsule for use in measuring and transmitting the pH of stomach fluid.

Recent progress in medical techniques has required a small pH radio capsule which can be swallowed by patients. It is desirable to measure telemetrically the pH in the stomach or intestine by using the swallowed pH radio capsule. A conventional pH-sensor usually comprises a glass electrode and a reference electrode which are separately assembled and is not easy for the patients to swallow.

In order to measure the pH of stomach fluid accurately over a long period of time, it is desirable to prepare a reference electrode having a stable electromotive force for a long period of operation. The stable electromotive force can be obtained only when the concentration of the internal solution in the reference electrode does not vary with time.

On the other hand, the miniaturization of a medical radio capsule results in a reference electrode which has a small volume of internal conducting solution.

Furthermore, the conventional reference electrode has only one opening which is used both as a liquid junction and for injection of the internal solution. The stopper in said opening has been designed to be removable. Such construction makes the use of the capsule difficult and complicated.

The conventional pH-sensor comprises a pH sensitive glass electrode and a reference electrode made of a glass tube, which electrodes are separately assembled parallel to each other on a wafer. But it is difficult to assure that the reference electrode will produce a stable electromotive force for a long period of time because a small glass tube can contain only a small volume of standard buffer solution.

An object of this invention is to provide a small pH-sensor characterized by a high stability of the electromotive force for a long period of time.

Another object of this invention is to provide a small pH radio capsule having a reference electrode with as large a volume as possible.

This invention contemplates preparing a novel pH-sensor which includes a reference electrode having a volume of standard solution therein large enough to keep the standard electromotive force stable over a long period of time.

These objects are achieved by a pH-sensor adapted to form a part of a telemetry capsule comprising a glass electrode combined with a first inner electrode, a reference electrode combined with a second inner electrode and an envelope in a cylindrical form, said envelope is divided by a spacer into two rooms, one of which has said glass electrode partly embedded therein and another of which is fillled with an electrolytic salt and has said second inner electrode attached to the bottom thereof and is covered with a plate having at least one hole which is used for both liquid junction and injection of water. Said envelope has a wafer attached to a bottom and said wafer has two electrical terminals on the outside of it.

More details of this invention will become apparent upon consideration of the following description taken together with the accompanying drawings, in which.

Figure 1:
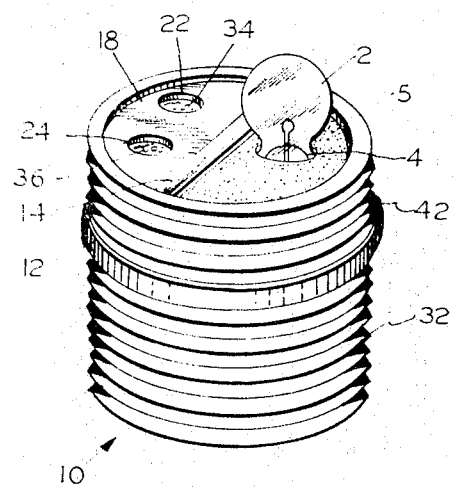
FIG. 1 is a perspective view of the pH-sensor according to the invention.
Figure 2:
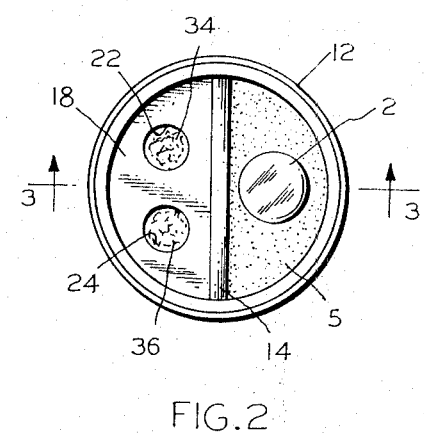
FIG. 2 is a plan view of the pH-sensor shown in FIG. 1.
Figure 3:
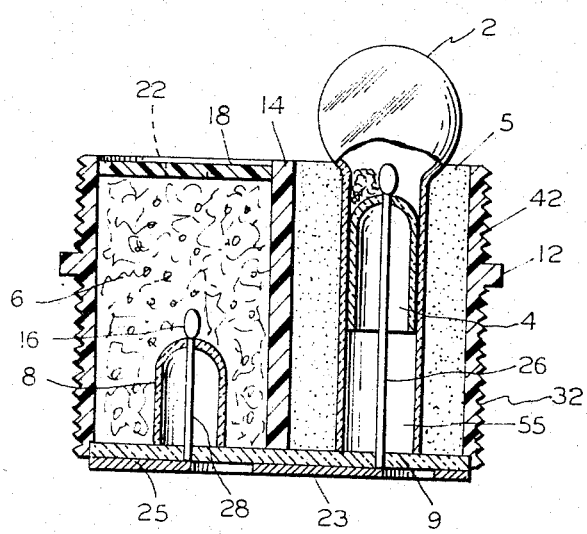
FIG. 3 is a cross-sectional view of the pH-sensor taken on line 3—3 of FIG. 2.

Referring to FIGS. 1, 2 and 3, reference character 10 designates, as a whole, a pH-sensor comprising a glass electrode 2 having a first inner electrode 4, a reference electrode 6 having a second inner electrode 8, and an envelope 12 having a cylindrical form. Said envelope 12 has a wafer 9 attached to a bottom thereof and is divided by a spacer 14 into two spaces which are electrically insulated and water tight with respect to each other. Said glass electrode 2 has the lower part thereof embedded in a body of resinous material 5 in one of said two spaces. Said second inner electrode 8 is attached to said wafer at the bottom of the other space of said two spaces. Said other space is filled with an electrolytic salt 16 and is covered, at the top thereof, with a half circular plate 18 having two holes 22 and 24 therein.

Said wafer 9 has two electrical terminals 23 and 25 attached to the outside surface thereof. Lead wires 26 and 28 of said first inner electrode 4 and said second inner electrode 8 extend through said wafer 9 in water tight engagement therewith, and are connected to said terminals 23 and 25, respectively.

Said envelope 12 can be made of any material which is water tight and can have threads formed thereon. A preferred material for said envelope 12 is a plastic such as Teflon, nylon or A.B.S. resin (copolymerized resin of Acrylonitrile, Butadiene and Styrene).

Figure 7:
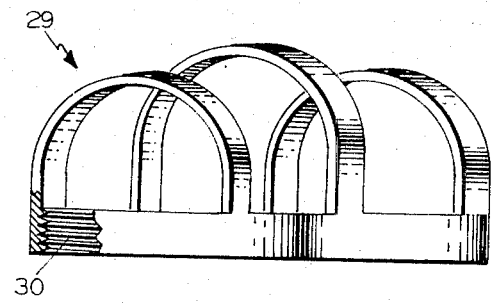
FIG. 7 is a partly cross-sectional and partly perspective view of a basket which covers the pH-sensor of FIG. 3.

When said pH-sensor 10 is used as a radio telemetry capsule, the pH-sensor 10 must be comgined with an oscillator unit 60 in one unit. It is convenient and easy to achieve such combination by forming an externally threaded portion 32 on the outside wall of said envelop 12. It is preferable that said envelope 12 also have an additional externally threaded portion 42 above said threaded portion 32 in order to provide a connection for a basket 29 shown in FIG. 7 which protects the glass electrode 2 from mechanical damage. The basket 29 has an internally threaded portion 30 on the inside wall thereof for attaching it to the threaded portion 42 on said pH-sensor. Said basket 29 can be made of any suitable metal having a high resistance to corrosion, such as stainless steel or gold plated brass.

Said spacer 14 can be made of any material which has a high electrical resistance and is water-tight. Glass fiber reinforced epoxy resin is preferred because it can be easily machined in addition to having the above necessary properties.

Said electrolytic salt 16 comprises basically potassium chloride in a solid state. When said second inner electrode 8 is a silver chloride electrode, said electrolytic salt 16 is preferably composed of a mixture of potassium chloride and silver chloride.

The half circular plate 18 of resinous material having the two holes 22 and 24 therein is adhered tightly to the half circular upper rim of one of the two spaces of the envelope 12. One of said two holes 22 and 24, for example, the hole 22, is filled with porous material 34 such as cork and is used as a liquid junction, and the other hole 24 is closed with rubber material 36 and is used for injection of water. Said two stoppers 34 and 36 are fixed tightly in the corresponding holes 22 and 24 with an adhesive. One can easily inject water into the reference electrode 6 by forcing the needle of an injector through said rubber material 36. After the needle is removed from the rubber material 36, the elasticity of the rubber material 36 closes the hole left by the needle to prevent water from passing through said rubber material 36.

Said two holes 22 and 24 can be replaced by a single hole filled with a porous elastic material such as vinyl sponge (partly acetalized polyvinyl alcohol with formaldehyde). Said single hole acts to permit injection of water and also serves as a liquid junction.

Figure 4:
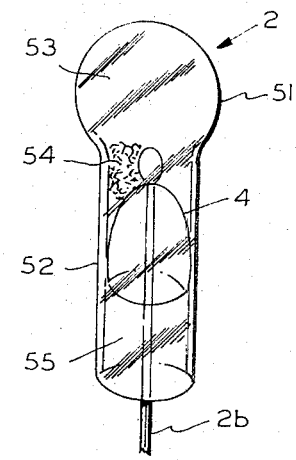
FIG. 4 is an enlarged perspective view of the glass electrode used in the present pH-sensor.

The aforesaid glass electrode 2 can be prepared by conventional techniques. Referring to FIG. 4, a pH sensitive glass bulb 51 forming the upper part of said glass electrode 2 is prepared by blowing a small piece of molten glass picked up by a glass steam 52, which forms the lower part of the glass electrode 2. It is necessary that the coefficient of thermal expansion of the glass of the stem 52 be essentially the same as that of the glass of the bulb 51. The inside of the glass electrode 2 is filled with a buffer solution 53 having a pH=7.

After the electrode bulb 51 is filled with a buffer solution 53 of pH=7 and a mixture 54 of potassium chloride and silver chloride, the first inner electrode 4 is inserted into the stem 52 and is adhered thereto by an adhesive 55 such as epoxy resin. The glass electrode 2 then has the lower part thereof secured in resinous material 5 filling one of said spaces in said envelope 12.

Figure 5:
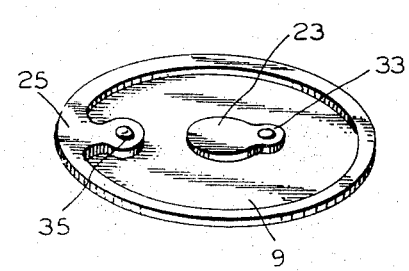
FIG. 5 is a perspective view of the wafer attached to the bottom of the pH-sensor.

The wafer 9 shown in FIG. 5 has two small holes 33 and 35, through which the lead wires 26 and 28 for electrodes 2 and 6 are connected to the corresponding electrical terminals 23 and 25 formed on the outside of said wafer 9. The electrical terminal 23 positioned at the center is for the glass electrode 2 and the terminal 25 is a ring-shaped electrical terminal 25 for the reference electrode 6.

When the said second inner electrode 8 of reference electrode 6 and glass electrode 2 are fixed to the said wafer 9, the ends of lead wires 28 and 26 extend through the said wafer 9 through the corresponding holes 35 and 33, and are connected to the corresponding electrical terminals 25 and 23 attached to the outside face of wafer 9, respectively.

Figure 6:
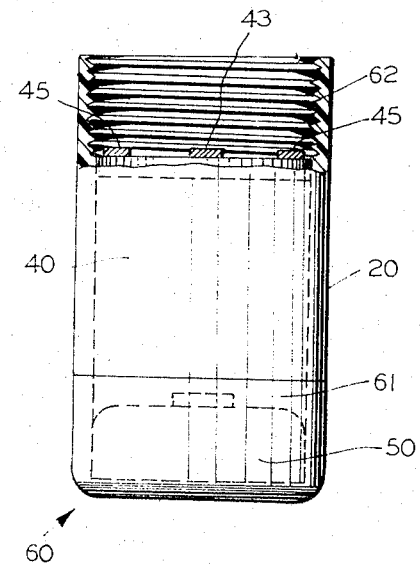
FIG. 6 is an elevational view, partially in cross-section, of an oscillator unit for combination with the pH-sensor of FIG. 3.

Referring to FIG. 6, reference character 60, as a whole, designates an oscillator unit having a housing 20 which is divided into two spaces 40 and 61. An oscillating circuit (not shown) comprising the necessary electronic components, such as a transistor, capacitors and resistors, is built into the space 40 of said housing 20. A battery 50 necessary for operation of said oscillator circuit is positioned in the other space 61. Said oscillator unit is provided with a spot electrical terminal 43 and a ring electrical terminal 45 for connection with the aforesaid pH-sensor 10. An internal threaded portion 62 is formed on the inner wall of said housing 20 and is engaged with the threaded portion 32 of the pH-sensor 10. In such a way, a radio capsule for telemetrically measuring the pH can be made. Any available and suitable oscillator circuit which produces radio waves corresponding to the electromotive forces of said pH-sensor can be used.

What is claimed is:

1. A pH-sensor for use in a radio capsule, comprising a cylindrical envelope having a spacer dividing said envelope into two spaces, a glass electrode having a first inner electrode therewithin and having a lower portion secured in one of said spaces, a reference electrode consisting of a second inner electrode and a body of electrolytic salt surrounding said second inner electrode, said body of electrolytic salt filling said other space in said envelope, a wafer of insulating material attached to the bottom of said envelope and having two electric terminals on the outside surface thereof, one attached to the first inner electrode and the other attached to the second inner electrode, and a plate covering said other space on the opposite end of said envelope from said wafer and having at least one hole therein with a liquid permeable closure means therein for forming a liquid junction with said reference electrode.

2. A pH-sensor as claimed in claim 1 in which said envelope is of an insulating plastic material and has at least one set of screw threads on the external surface thereof for enabling attachment thereto of an oscillator unit.

3. A pH-sensor as claimed in claim 2 further comprising an oscillator unit embedded in a resin capsule having an internally threaded portion thereon threadedly connected to said envelope.

References Cited

UNITED STATES PATENTS 3,398,079   8/1968   Arthur et al. _____ 204—195.1
3,440,525   4/1969   Cardeiro _____ 204—195.1

T. TUNG, Primary Examiner

U.S. Cl. X.R.

128—2.1